United States Patent [19]

Wirth et al.

[11] 4,130,989
[45] Dec. 26, 1978

[54] AUTOMOTIVE TURBINE ENGINE

[76] Inventors: Richard E. Wirth, 1574 Melba Ct., Mountain View, Calif. 94040; Manfred N. Wirth, 1021 Heatherstone Way, Sunnyvale, Calif. 94087

[21] Appl. No.: 829,258

[22] Filed: Aug. 31, 1977

Related U.S. Application Data

[60] Continuation of Ser. No. 415,331, Nov. 13, 1973, abandoned, which is a division of Ser. No. 90,192, Nov. 19, 1970, Pat. No. 3,771,312.

[51] Int. Cl.² .......................... F02C 7/00; F02C 7/08
[52] U.S. Cl. .................................... 60/39.52; 60/39.43
[58] Field of Search ............... 60/39.03, 39.12, 39.16, 60/39.17, 39.25, 39.29, 39.43, 39.52

[56] References Cited

U.S. PATENT DOCUMENTS

| | | | |
|---|---|---|---|
| 2,694,291 | 11/1954 | Rosengart | 60/39.43 |
| 3,156,093 | 11/1964 | Chapman | 60/39.43 |

*Primary Examiner*—Louis J. Casaregola
*Attorney, Agent, or Firm*—John R. Murtha

[57] ABSTRACT

Gas flow through a turbine is divided, with part of the flow directed to the compressor for the combustion chamber and part directed to the primary power turbine. Division of the gas flow is accomplished by a mixing wheel of novel design. Before passing to the primary power turbine the gas flow passes through a secondary power turbine that drives the compressor for the combustion chamber. Both the secondary power turbine and the compressor rotate independently of the main turbine rotor shaft. The power input to the secondary power turbine is varied in accordance with the pressure differential between the gas pressure at the outlet of the compressor for the combustion chamber and the outlet from the mixing wheel. If the speed of the main turbine shaft slows down more power is put into the secondary power turbine and the combustion chamber compressor is speeded up so as to produce a higher gas pressure than would otherwise be the case.

1 Claim, 9 Drawing Figures

AUTOMOTIVE TURBINE ENGINE

This is a continuation application of application Ser. No. 415,331, filed Nov. 13, 1973, now abandoned, which, in turn, was a divisional application of application Ser. No. 90,192, filed Nov. 19, 1970, now U.S. Pat. No. 3,771,312.

The invention relates to turbine engines and more particularly to an improved turbine engine construction which will permit the main turbine to run efficiently at high or low speeds and at varying power outputs such as those encountered, for example, in the operation of an automobile.

To be efficient, any engine operation on a thermodynamic cycle should utilize as much of the heat generated by the combustion of the fuel as is possible. Maximum utilization of combustion heat occurs when the exhaust temperature of the combustion gases after expansion approaches atmospheric temperature. High efficiency in a turbine engine requires that the gas pressure of the combustion gases with respect to the gas temperature prior to expansion be such that, upon the subsequent expansion of the combustion gases, the exhaust temperature of the combustion gases will approach atmospheric temperature as closely as possible.

Combustion pressure in a turbine engine varies as the square of the change in speed. Any reduction in speed, therefore, causes a much greater reduction in gas pressure. Because of this relationship, any significant reduction in turbine speed is followed by an excessive drop in gas pressure. The excessive drop in gas pressure means that an efficient ratio of gas pressure to gas temperature cannot be maintained. Expansion of the combustion gases in such case fails to utilize a large amount of the heat available and the exhaust temperature of the gases remains high and does not approach atmospheric temperature. The efficiency of the engine falls off appreciably — so much so as to preclude the use of the engine in certain applications where it might otherwise be advantageous.

Accordingly, turbine engines heretofore have been primarily utilized in applications where the powder demands on the engine are fairly constant. Such applications permit the engine to be run with relatively few speed changes and, hence, at relatively high efficiencies. Where, however, the power demands of a particular application such as that of powering an automobile, vary significantly, the drop in the efficiency of the turbine engine which accompanies significant speed changes has precluded the use of turbine engines in such applications.

The present invention has for its object an improved turbine engine construction which will permit the engine to be run efficiently over a wide range of speed changes so that the engine may advantageously be used in applications with varying power output demands.

One manner in which the invention may be practiced is shown in the accompanying drawings and will be described in the detailed description which follows. It is to be understood, however, that the following detailed description, and the drawings, are by way of illustration only and are not intended to restrict or define the invention, the claims appended hereto, together with their lawful equivalents, being relied upon for that purpose.

Figure 1:
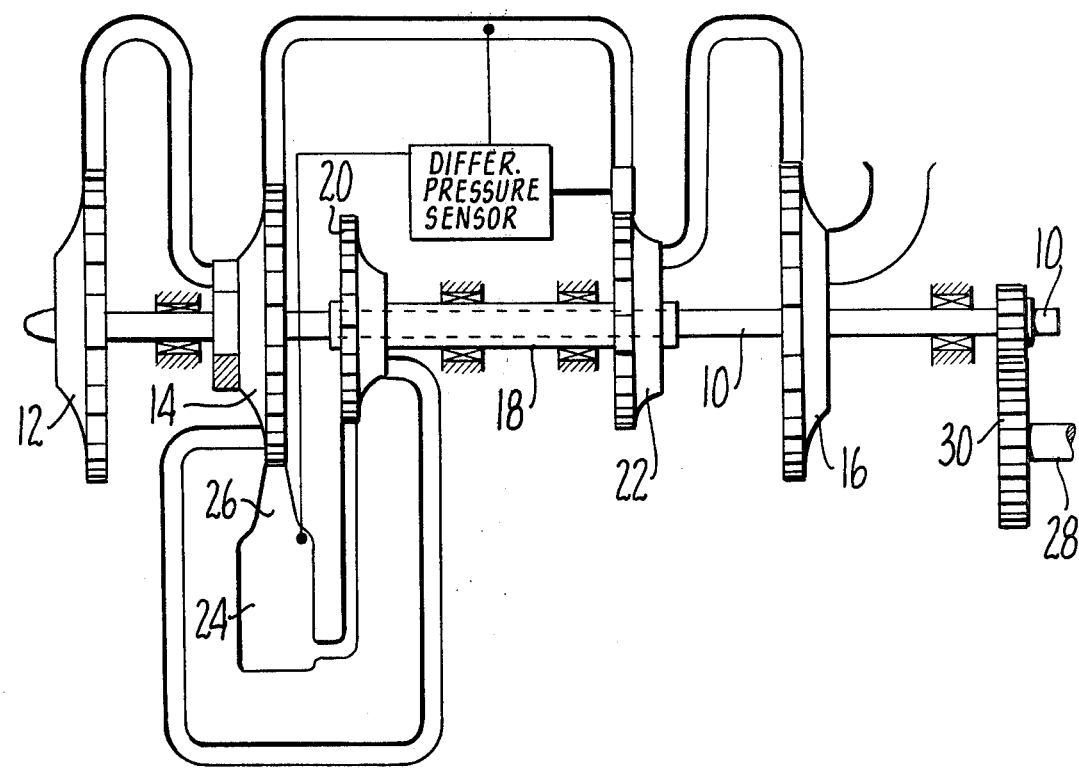
FIG. 1 is a schematic diagram showing the general configuration of the turbine engine.

The turbine engine construction of the present invention utilizes a main or primary air compressor, a mixing wheel and a primary power turbine, all arranged on a main turbine rotor shaft. As shown in the accompanying drawings the air compressor may be operated in a single state without cooling devices. It may also be operated in multistages and with intermediate cooling. A combustion air compressor and its associated secondary power or drive turbine are also provided and both are so arranged as to be rotatable independently of the main turbines shaft and its rotary components. This arrangement may take many forms. In the form of the invention shown in the drawings the combustion air compressor and its driving turbine are mounted on an independently rotatable spool shaft which surrounds the main turbine shaft.

At the inlet to the secondary power turbine variable inlet vanes are so provided as to variably control the angle of attack of the gas flow against the turbine blades and consequently the rotational speed of the turbine. The actuating mechanism for the inlet vanes responds to a differential pressure-sensing device which senses the pressure ratio of the mixing wheel output pressure to the combustion air compressor output pressure. This pressure ratio varies inversely with the rotational speed of the secondary power turbine. At low mixing wheel speeds, with the attendant drop in pressure, the inlet vanes of the secondary turbine are adjusted so as to speed up the secondary turbine and the combustion air compressor which it drives. At high mixing wheel speeds (and pressures) the vanes are adjusted to decrease the speed of the secondary turbine and combustion air compressor.

The present turbine engine construction employs a differential fluid flow system with two gasifier sections. One gasifier section is made up by the main air compressor, the combustion air compressor and its secondary drive turbine and the combustion chamber of the turbine. This gasifier section is a high pressure system with a relatively small flow. It discharges hot combustion products at high velocity into the other gasifier section, the mixing wheel. The mixing wheel makes up a low pressure system with a large gas flow. The air-gas mixture discharged from the mixing wheel forms the fluid flow for driving the secondary and primary power turbines. With the exception of the mixing wheel, which is of the centrifugal impeller type, all compressor or turbine components may be either of the axial or radial type and may be either single or multistage.

Reference will first be made to FIG. 1 for a general description of an exemplary turbine engine. The engine comprises a single shaft, radial-type, gas turbine with five rotors. Three of the rotors are mounted on a main turbine shaft 10. These rotors are the main air compressor 12, the mixing wheel 14 and the primary power turbine 16. The other two rotors rotate on a spool shaft 18 which fits around a portion of the main turbine shaft 10 and which is independently rotatable with respect thereto. These rotors are the combustion air compressor 20 and a secondary power turbine 22 which constitutes the driver for the combustion air compressor. A can type combustion chamber 24 is provided for the turbine and has an air cooled outlet nozzle 26. The outlet nozzle 26 directs the combustion gases to the mixing wheel 14 where they are mixed with incoming compressed air. From the mixing wheel 14 the gas mixture passes to the secondary power turbine 22. The amount of power developed at this turbine is variable and is controlled so as to maintain the combustion air compressor 20 at a speed which will develop a desirable ratio of gas pressure to gas temperature in the combustion gas. Thereafter the gas mixture passes to the primary power turbine. Expansion of the combustion gases in the primary power turbine 16 proceeds to a point where a terminal temperature approaching that of atmospheric is achieved. The power output thereby developed in the main turbine shaft 10 is then passed on to an output shaft 28 through a suitable gear train 30 which steps down the high speed of the turbine shaft to the desired speed at the latter shaft.

Figure 2:
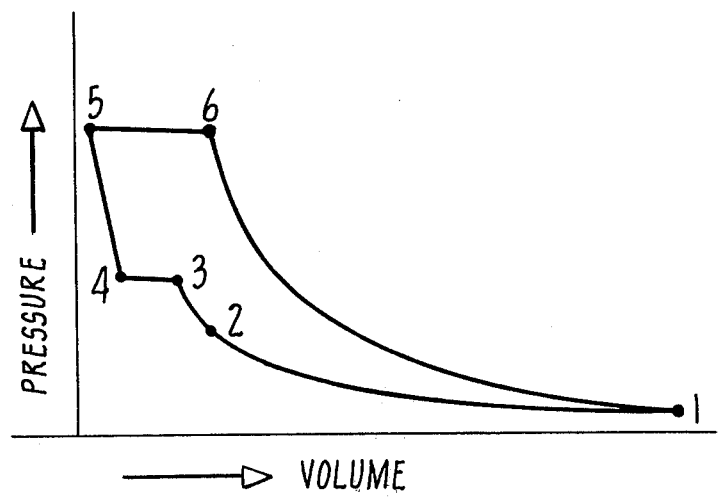
FIG. 2 is a pressure-volume diagram illustrating the working process of the engine.

The working diagram of the turbine engine is shown in FIG. 2. Line 1–2 represents the compression which takes place in the main air compressor. This compression may be polytropic, that is, without intercooling or near isothermal with intercooling. The line 2–3 represents further compression in the mixing wheel. Line 3–4 represents the division of the gas-flow which occurs when part of the air is conveyed to the combustion air compressor, to be super compressed. This compression is represented by the line 4–5. The major part of the compressed air is trapped in the mixing wheel 14. Line 5–6 represents fuel-air combustion in the combustion chamber, as well as the combustion-gas mixture with the trapped air in the mixing wheel. The final line, 6–1, represents the adiabatic expansion of the combustion gases through the secondary and primary power turbines.

The combustion gases exiting from the combustion chamber 24 are mixed in the mixing wheel 14 with the trapped air at constant volume. Since the mixing proceeds with constant volume, the increase in pressure is directly proportional to the increase in absolute temperatures. The relationship may be expressed mathematically as follows:

$$\frac{\text{abs. mix temp. } T_m}{\text{abs. temp. of the mixing air } T_i} = \frac{\text{mix press } p_m}{\text{mixing air press. } p_i}$$

From the above equation it is clear that the mixing pressure is equal to the mixing air pressure of the gas medium times the ratio of the mixture temperature to the mixing air temperature:

$$p_m = p_i \frac{T_m}{T_i}$$

If the weight of the combustion gases is represented by Gg and Gi represents the weight of mixing air trapped in the mixing wheel, then the heat in the combustion gases may be represented by the formula:

$$q_g = G_g \times c_g (t_g - t_a)$$

wherein cg is equal to the specific heat of the combustion gases and tg is equal to the temperature of the combustion gases and ta is the temperature of the atmospheric air.

If the heat energy given off during the flow into the mixing chamber in the form of work, that is to the blades, be disregarded, the quantity of heat given off to the compressed mixing air may be expressed as:

$$Q_m = G_g \times c_g (t_g - t_m)$$

Qm is the heat that raises the temperature and pressure in the mixing chamber. It may also be expressed as:

$$Q_m = G_i \times c_i (t_m - t_i)$$

From these latter two equations, the mixing ratio can be stated as:

$$\frac{G_i}{G_g} = \frac{c_g (t_g - t_m)}{c_i (t_m - t_i)}$$

wherein ci is equal to the specific heat of the compressed mixing air.

Reference will now be had to FIGS. 3–9 for a detailed description of the construction features of an exemplary turbine engine.

Figure 3:
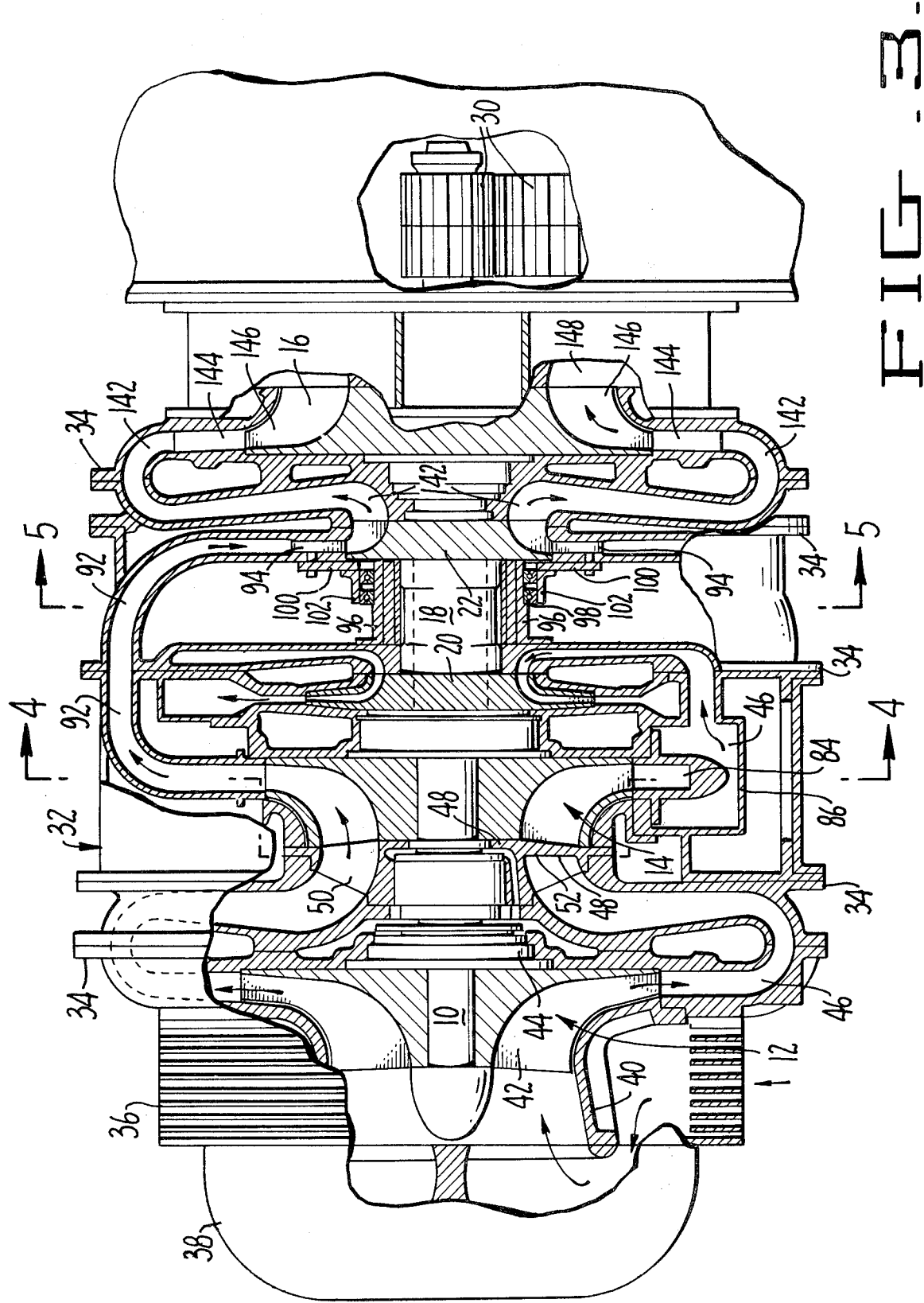
FIG. 3 is a side elevational view, partly in section, of a turbine engine constructed in accordance with the teachings of the invention.
Figure 4:
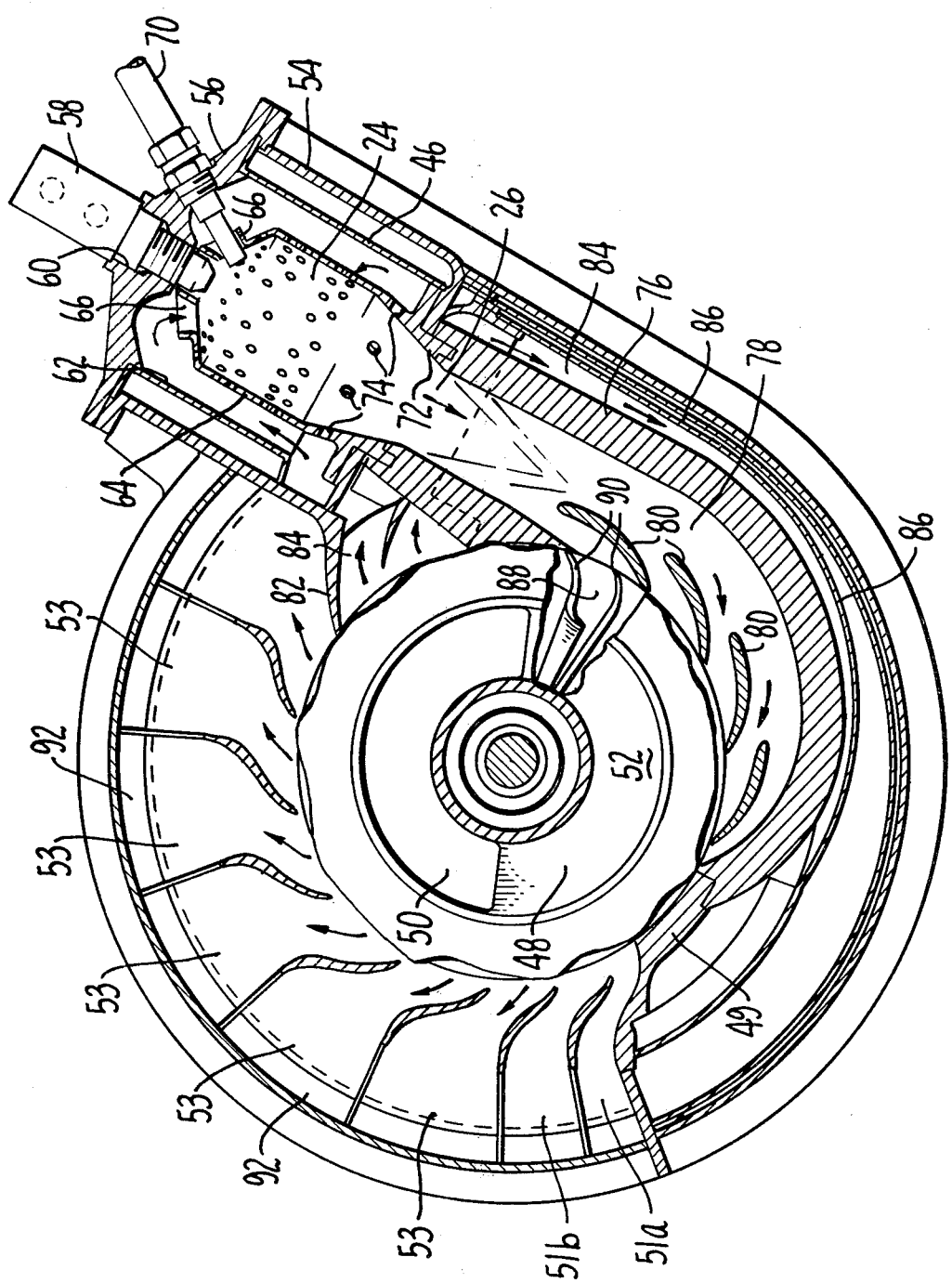
FIG. 4 is a sectional view taken along the line 4—4 in FIG. 3, looking in the direction of the arrows.

For ease of access the outer casing 32 of the turbine is formed in a plurality of removable sections which are bolted together at the flanges 34,34. An annular air filter 36, in combination with a dome-like noise suppressor 38, is provided at one end of the turbine casing. The air filter surrounds the outwardly flaring mouth section 40 of the air inlet for the main turbine air compressor. The main turbine air compressor 12 may be single or multi-state and may be of the centrifugal, or axial type, or of any other suitable type. It may also be made with or without cooling means. As shown, the compressor comprises a centrifugal impeller 42 of customary configuration and is mounted on the leftward end (as shown in FIG. 3) of the main turbine shaft 10. A self-adjusting labyrinth type seal 44 is provided to prevent interstage leakage along the turbine shaft.

Initial compression of the air takes place in this air compressor stage 12. The compressor stage then discharges the compressed air into a circumferential duct 46 formed in two of the sections of the outer casing 32 of the turbine. The circumferential duct 46 conducts the compressed air to the mixing wheel 14. Before entering the rotating mixing wheel 14 the air must pass through an air inlet valve plate 48. As will be best seen by reference to FIG. 4, the air inlet valve plate 48 is stationary and provides a partial annular opening 50 for the passage of air for only one-half of its circumferential extent, the other half of the annular opening being blocked off by a wall segment 52. Passage of compressed air into the mixing wheel 14 can take place, therefore, only through approximately 180° of mixing wheel rotation.

A can-type combustion chamber 24 (FIG. 4) is positioned at one point on the periphery of the mixing wheel. The outer casing 54 of the combustion chamber 24 is of generally cylindrical configuration and has a removable closure plate 56. A fuel injection nozzle 58 is provided on the central axis of the chamber and protrudes inwardly of the closure plate 56 through an opening 60 formed therein. An inner wall 62 defines an air passageway which completely encompasses the perforated combustion chamber wall 64. A large air inlet opening 66 is formed at the outer end of the chamber wall 64. The opening 66 also provides access for a spark plug 70 that is mounted on the closure plate 56. The inner end of the combustion chamber 24 is formed by a casing 72 that tapers inwardly so as to form the throat of a nozzle 26 for the combustion gases. Air openings 74,74 are provided in the nozzle casing 72 but these openings are less numerous than the opening in the combustion chamber wall 64. A gradually flaring casing 76 defines a nozzle diffuser section 78 that guides the combustion gases to the mixing wheel 14. Stationary guide vanes 80,80 direct the flow of combustion gases into the wheel at the desired angle of attack.

The configuration of the mixing wheel 14 is believed to be novel. As previously mentioned the inlet to the mixing wheel is controlled by the inlet valve plate 48 so that compressed air from the main air compressor enters the mixing wheel during only about 180° of the wheel's rotational travel. The entering air undergoes further compression in the mixing wheel 14 and some of this air is discharged into a passageway 84 that leads to the combustion air compressor 20. To this end a dividing baffle 82 extends inwardly from one side wall of the casing 54 for the combustion chamber 24 to a point immediately adjacent the circumference of the mixing wheel. This baffle serves to define one side of an air passageway 84 which surrounds the nozzle diffuser casing 76. The other side of the passageway 84 is formed by duct sheeting 86 which directs the air past the diffuser casing 76 and into a conduit that leads to the combustion air compressor 20.

The combustion gases from the combustion chamber are discharged at high velocity into the chambers 88,88 formed between the blades 90,90 of the mixing wheel 14. There the combustion gases mix with the relatively cool air that is trapped between the blades when the blades, during the rotation of the mixing wheel, come opposite the discharge nozzle diffuser section. This mixing process occurs with constant volume because of the closure provided by the wall segment 52 of the air inlet valve plate 48. For approximately 180° of rotation the vanes 90,90 of the mixing wheel 14 communicate with a circumferential duct 92. The combustion gases mix with the compressed air trapped between the vanes 90,90 of the mixing wheel. A transfer of heat takes place and the temperature of the compressed air is significantly increased. This increased temperature further raises the pressure of the air since the closure of the wall 52 prevents any expansion thereof. The pressure of the air-gas mixture is, thus, raised to a high value as it passes through that portion of mixing wheel rotation blocked by the closure ring 49 located adjacent the outer circumference of the mixing wheel.

As the air-gas mixture clears the end of the closure ring 49, it is discharged at high velocity into the first two chambers 51a and 51b. Further discharge of the air-gas mixture into the remaining chambers 53,53 occurs as the wheel continues to rotate, however, the discharge of the mixture is the result of a scavenging action of the incoming compressed air. As the combustion gas-air mixture is discharged into this circumferential duct a limited expansion of the gas mixture takes place. The duct 92 then conveys the gas mixture to the variable inlet vanes 94,94 of the secondary power turbine 22 which serves to drive the combustion air compressor 20.

Figure 6:
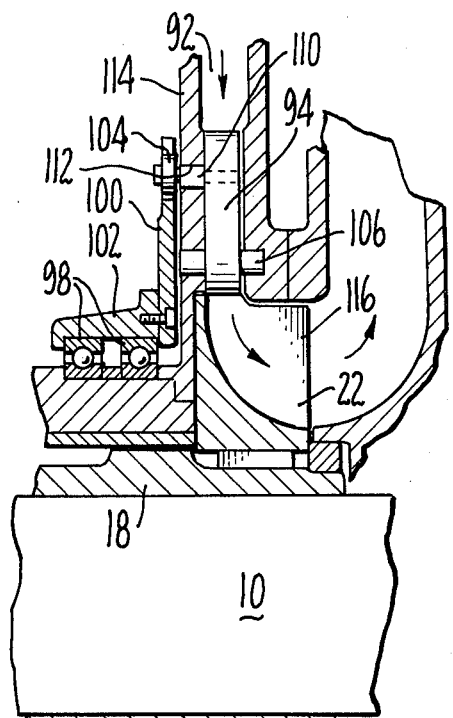
FIG. 6 is an enlarged, detailed view of the secondary power turbine and its associated, variable inlet vanes.

As previously stated the combustion air compressor 20 and its associated secondary power turbine drive 22 are mounted on an independently rotatable spool shaft 18 which surrounds the main turbine shaft 10 (FIG. 6). A bearing housing 96 is located between the compressor 20 and turbine 22 and a pair of ball bearings 98,98 are mounted on the housing. In turn, an annular disc 100 is secured to a mounting ring 102 and the assembly of disc 102 and ring 100 mounted on the ball bearings 98,98. The outer circumference of the annular disc 100 is formed with a plurality of equally-spaced radial slots 104,104, there being one radial slot 104 for each variable inlet vane 94.

Figure 7:
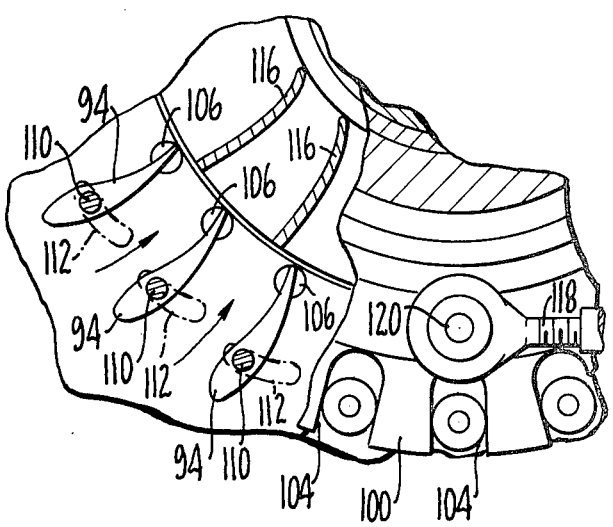
FIG. 7 is an enlarged detailed view, partly in section, showing the arrangement of the inlet vanes relative to the secondary power turbine.
Figure 8:
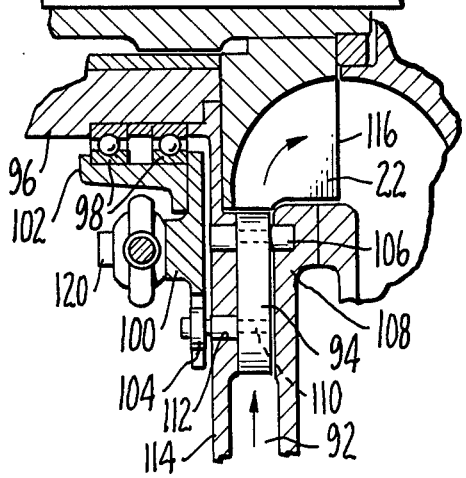
FIG. 8 is a view similar to that of FIG. 7, showing the inlet vanes in a different position.
Figure 8:
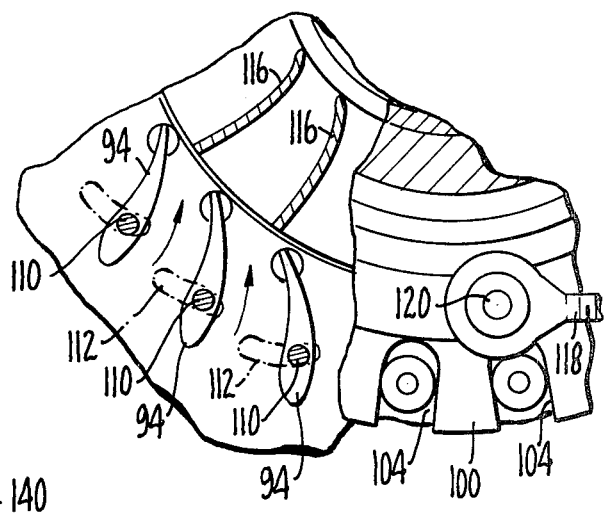
Figure 9:
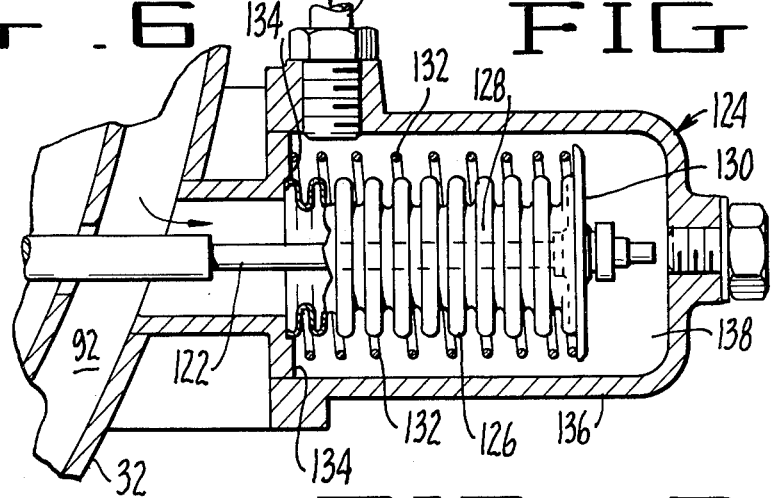
FIG. 9 is a detailed view, partly in section, showing the differential pressure-sensing device.

As is best seen in FIGS. 6, 7 and 8, each variable inlet vane 94 is provided with a pin 106,106 at the inner end of the vane and the ends of the pin are pivotally mounted in the duct casing 108 so as to form an axis about which the inlet vane 94 may be turned or rotated. A second pin 110,110 is provided for each vane 94 and is positioned in the vane at its thickest part. This second pin 110 extends through an access opening 112,112 in the wall 114 of the duct 92 and into one of the radial slots 104 formed in the periphery of the annular disk 100. Lateral rotational movement of the disk 100 moves the second pin 110 relative to the first pin 106 and varies the inclination of the inlet vane 94 relative to the turbine vanes 116,116.

Lateral or rotational movement of the disk 100 is effected by a connection rod 118. One end of the connecting rod 118 is secured to a stud 120 on disk 100. The opposite end 122 of the connecting rod 118 extends through the turbine casing 32 and gas duct 92 into a pressure differential sensing device 124. The sensing device 124 is secured to the outer wall 32 of the circumferential duct 92 between the discharge from the mixing wheel and the inlet to the secondary power turbine. A steel bellows 126 is mounted internally of the sensing device in gas-tight relation with the duct 92. The interior space 128 of the bellows 126 is open and subject to the gas pressure in the duct 92. The opposite end 122 of connecting rod 118 is suitably fixed, in a gas-tight manner, to the outer end 130 of the steel bellows 126. A biasing spring 132 is positioned between the outer end 130 of the bellows 126 and the inner end 134 of the sensor housing 136. The space 138 within the sensor housing 136 surrounding the bellows 126 is communicated with the duct 46 surrounding the combustion chamber 24 through a conduit 140. In this way a pressure differential is applied across the bellows. The internal space 128 within the bellows 126 is subject to the gas pressure in the duct 92 leading away from the mixing wheel 14 while the surrounding space 138 outside the bellows 128 is subject to the discharge pressure of the combustion air compressor 20.

Figure 5:
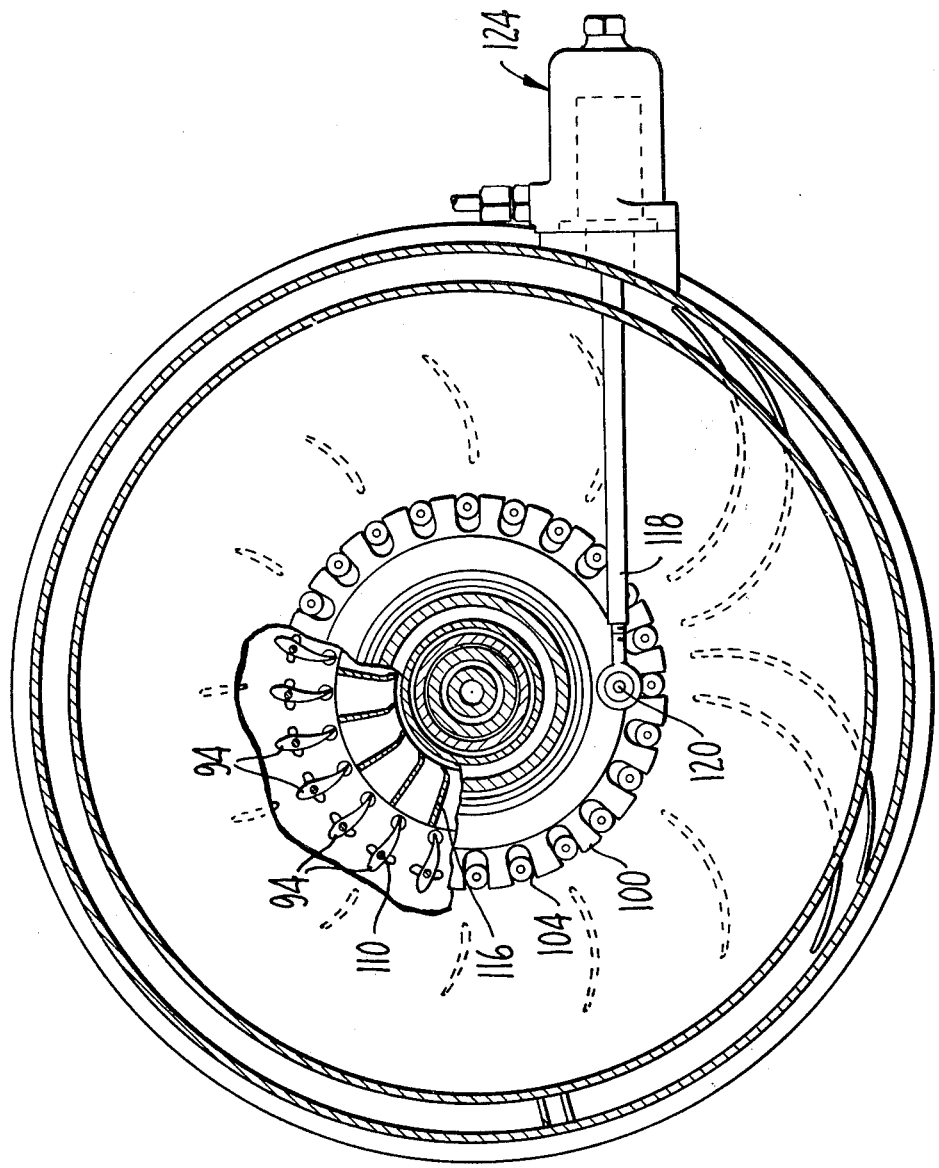
FIG. 5 is a sectional view taken along the line 5—5 in FIG. 3, looking in the direction of the arrows.

As will be explained more fully hereafter, the pressure differential across the bellows 126 serves to adjust the attitude of the inlet vanes 94,94. When the bellows 126 is moved outwardly the connecting rod 118 is likewise moved in the same direction with a resulting counterclockwise movement of the annular disk 100 (as seen in FIG. 5). The counterclockwise movement of the disk 100 moves the pins 110 on the vanes counterclockwise. When the vanes 94 are moved counterclockwise, the angle of attack of the inflowing gases is increased and the secondary power turbine 22 will accelerate to a higher speed. Clockwise movement in the system decreases the angle of attack of the inflowing gases and the turbine slows down.

The partially expanded gases from the secondary power turbine 22 are conveyed by a duct 142 to the inlet blades 144,144 of the primary power turbine 16. These inlet blades 144,144 are arranged around the circumference of the turbine rotor 16 and direct the gas mixture at the blades 146,146 of the turbine 16 at the desired angle. As the gas mixture passes through the blades 146 of the turbine 16, it expands again to approximately atmospheric pressure. The exhaust gases are discharged from the turbine 16 through a circumferential duct 148 into the atmosphere.

The operation of the engine and the differential pressure control sensor may be shown by an example:

Assume the engine is designed to run at 40,000 RPM and when running at this speed will generate a gas pressure of 88 PSIA at the outlet of the mixing wheel 14. Compressed air leaves the mixing wheel 14 through the conduit 46 and passes to the combustion air compressor 20 where it is further compressed to the end pressure desired in the combustion chamber 24. At the same time, the gas mixture generated in the mixing wheel 14 passes through the duct 92 to the variable inlet vanes 94 at the secondary power turbine 22 which drives the combustion air compressor 20. Since the pressure of the gas mixture at the outlet of the mixing wheel is communicated with the internal space 128 inside the bellows 126 in the sensor housing 136, this pressure exerts an outwardly acting force which, in conjunction with the bias force of the spring 132, moves the bellows 126 to its fully extended position. In this extended position the connecting rod 118 holds the annular disk 100 in the maximum counterclockwise position. The variable inlet vanes 94 will, accordingly, be positioned to direct the inflowing gases at the turbine 22 with a maximum angle of attack.

Inasmuch as the angle of attack of the inflowing gases is at a maximum, the speed of the turbine 22 will increase and so will the speed of the combustion air compressor 20 which it drives. The combustion air compressor 20 will generate an increase in air pressure proportional to the square of the speed increase. This higher pressure will be communicated so the space 138 surrounding the bellows 126 and acts to move the bellows inwardly. Inward movement of the bellows 126 moves the variable inlet blades 94 in a clockwise direction. The angle of attack of the incoming gases is decreased and the speed of the turbine 22 decreases. It continues to decrease until the outlet pressure of the combustion air compressor reaches 132 PSIA. At this point the pressures in the sensor are balanced.

By selecting the proper spring rate and the pretension of the biasing spring 132 in the sensor, a balance of the system can be achieved at any desired combustion air pressure.

When it is desirable or necessary to run the engine at a lower or idling speed, the fuel control (not shown) to the combustion chamber 24 is adjusted to cut down on fuel. The heat output and temperature of the combustion gases are reduced correspondingly. This reduces the power input and results in a slowing of the main turbine shaft 10. With the fall off in speed there is a sharp reduction in the gas pressure at the outlet of the mixing wheel 14 as well as in the pressure produced by the combustion air compressor 20. The net result is that the bellows 126 will be extended outwardly since the bias force of the spring 132 remains the same. The sensor will, accordingly, take a new balanced position by adjusting the variable inlet vanes 94 so as to drive the turbine fast enough to produce a balancing pressure at the combustion air compressor.

For example, if the cross sectional area of the bellows is one square inch, the gas pressure at the design speed of 40,000 RPM will exert an outward force of 88 pounds on the bellows. The combustion air pressure will exert an inwardly directed force of 132 pounds. Since the sensor is in balance at this point, the bias spring and the spring force of the convolutions of the bellows exert a force equal to the difference, or 44 pounds. When the lower speed of the turbine produces a pressure drop to a pressure of 20 PSIA at the outlet of the mixing wheel, the total outward working forces on the bellows is 64 pounds (20 + 44). The combustion air pressure will have to be 64 PSIA to balance this outward force. Accordingly, the variable inlet vanes adjust automatically to increase the angle of attack of the inflowing gases to the point where the secondary power turbine drives the combustion air compressor at that speed which generates an outlet pressure of 64 PSIA.

The heat output and combustion gas temperature at this lower speed is such that a combustion gas pressure of 64 PSIA at the subsequent expansion in the succeeding stages will reduce the temperature of the exhaust gases to nearly ambient temperature. Thus, while the turbine would be running at a lower speed and with a reduced power output, the efficiency of the engine would be approximately as high as usual.

We claim:
1. In a gas turbine, the combination of
 (a) a mixing wheel comprising a radial flow centrifugal impeller;
 (b) a combustion chamber adjacent the periphery of said mixing wheel.
 (c) said mixing wheel having an annular inlet on one face thereof to receive compressed air,
 (d) means including a first fixed opening controlling said annular inlet to admit compressed air to the mixing wheel for only a first arcuate portion of the wheel's rotational travel.
 (e) means including a second fixed opening for communicating the exhaust of said combustion chamber with the periphery of said mixing wheel for only a second arcuate portion of the wheel's rotational travel so as to conduct the gases from the combustion chamber to said mixing wheel,
 (f) means closing off said annular inlet and the periphery of said mixing wheel for only a third arcuate portion of the wheel's rotational travel wherein said compressed air and combustion gases are mixed in the mixing wheel under constant volume, and
 (d) mixture exit means occupying only a forth arcuate portion of the wheel's rotational travel.

* * * * *